United States Patent
BeSerra et al.

(10) Patent No.: US 11,120,136 B1
(45) Date of Patent: Sep. 14, 2021

(54) MANAGING SYSTEM FIRMWARE

(71) Applicant: Amazon Technologies, Inc., Seattle, WA (US)

(72) Inventors: Christopher James BeSerra, Federal Way, WA (US); Tyler Huston Doornenbal, Bothell, WA (US); Gavin Akira Ebisuzaki, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 356 days.

(21) Appl. No.: 16/001,564

(22) Filed: Jun. 6, 2018

(51) Int. Cl.
| | |
|---|---|
| *H04L 29/06* | (2006.01) |
| *G06F 21/57* | (2013.01) |
| *G06F 8/656* | (2018.01) |
| *G06F 9/4401* | (2018.01) |
| *G06F 8/71* | (2018.01) |
| *G06F 21/44* | (2013.01) |

(52) U.S. Cl.
CPC ............ *G06F 21/572* (2013.01); *G06F 8/656* (2018.02); *G06F 8/71* (2013.01); *G06F 9/4401* (2013.01); *G06F 21/44* (2013.01)

(58) Field of Classification Search
CPC .......... G06F 21/572; G06F 8/656; G06F 8/71; G06F 9/4401; G06F 21/44
See application file for complete search history.

(56) References Cited

U.S. PATENT DOCUMENTS

| | | | |
|---|---|---|---|
| 8,856,772 B2 * | 10/2014 | Fan .................... | G06F 8/654 717/168 |
| 2012/0084552 A1 * | 4/2012 | Sakthikumar ......... | G06F 9/4812 713/100 |
| 2014/0089651 A1 * | 3/2014 | Yao ..................... | H04L 63/0853 713/2 |
| 2016/0378990 A1 * | 12/2016 | Goodman ............. | G06F 21/64 726/19 |
| 2017/0293341 A1 * | 10/2017 | Jenne ................... | G06F 1/3206 |
| 2018/0004505 A1 * | 1/2018 | Annapureddy ....... | G06F 3/0619 |
| 2018/0165455 A1 * | 6/2018 | Liguori ................ | G06F 9/4406 |

\* cited by examiner

*Primary Examiner* — Tri M Tran
(74) *Attorney, Agent, or Firm* — Kilpatrick Townsend & Stockton LLP (57) ABSTRACT

Firmware modules for a plurality of computer components of a computer system can be downloaded from an external computer system via a network connection. The firmware modules can be stored in a firmware memory of the computer system. During booting or at other appropriate times, the plurality of computer components can access the firmware memory to obtain their respective firmware modules.

18 Claims, 7 Drawing Sheets

MANAGING SYSTEM FIRMWARE

BACKGROUND

A computer system includes different elements that require firmware for correct operation. Typically, each element stores its respective firmware in its own memory. For example, system Basic Input/Output System (BIOS) firmware can be stored in BIOS flash memory. Similarly, baseboard management controller (BMC) firmware can be stored in BMC flash memory.

BRIEF DESCRIPTION OF THE DRAWINGS

Various examples in accordance with the present disclosure will be described with reference to the drawings, in which.

DETAILED DESCRIPTION

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

Examples described herein are directed to, among other things, a computer system that includes a secure firmware storage location that is commonly accessible by various computer components of the computer system. Instead of these computer components maintaining their firmware in their own memories or in other disparate locations, the system includes one common location for storing firmware for many or all components that may require firmware. For example, the computer system described herein can be implemented within any suitable chassis or component (e.g., hardware servers for computing or storage, networking hardware for switching or load balancing, power equipment, and any other suitable device that may be used within a datacenter and mounted within a rack). The system can be implemented at a server level such that each slot in the server rack includes its own common and secure firmware storage location for storing firmware for its respective computer components on the slot (e.g., within a system board). The storage location is common in that it stores firmware for more than one computer component. The storage location is secure in that the contents of the storage location can be downloaded via a secure connection with a network server. In this manner, the storage location can be authenticated using any suitable technique such that the storage location becomes a trusted network storage location. Once trusted, firmware can be sent to the storage location for future loading by the computer components. When appropriate (e.g., as part of a reboot, live update, etc.), the computer components are enabled to access the storage location and load their respective firmware from the storage location. In some examples, because management of the firmware updates is centralized using network-level security, this system reduces the number of threat locations where nefarious firmware could be introduced into the computer system. Likewise, management of firmware across the computer system is simplified.

Turning now to a particular example, a computer system is provided that includes a system board to which multiple computer components are electrically coupled. These computer components may require firmware for appropriate operation. The computer system can also include a secure datastore for storing firmware and a network card or other computing device. The network card can communicate with an external network server and manage access to the secure datastore by the computer components. To begin, the network card can establish a secure connection with the external network server. This can be performed using any suitable authentication approach (e.g. key authentication, etc.). Once authenticated, firmware modules are sent to the network card and stored in the secure datastore. A firmware manifest (e.g., contextual information about the firmware modules) can also be sent to the secure datastore. As part of booting the computer system, the network card can instruct the appropriate computer components to access the appropriate firmware modules from the secure datastore. For example, a power supply unit (PSU)—an example of a computer component—can access PSU firmware from the secure datastore and load the PSU firmware from the secure datastore as part of booting the PSU.

The techniques described herein improve the functioning of computer systems that manage firmware updates. As an example, the techniques and systems described herein provide improved security by limiting the potential threats for deployment of nefarious code. For example, because the common storage location is authenticated and trusted, it can be treated as a single source of trusted truth for firmware. In conventional systems, individual computer components maintain their own storage locations for firmware, which means there exists multiple different sources of firmware for the individual computer components. These multiple sources are not typically authenticated or verified prior to deployment of the firmware. Thus, the potential for deployment of nefarious firmware is increases incrementally as the number of storage locations increases.

In some examples, because the use of a common secure storage location simplifies the number of locations where firmware is stored, system firmware can be updated with a single update tool. In some examples, because system firmware is stored in the common secure storage location, retirement of computer systems can be executed in a safer and more efficient manner. For example, to delete all system firmware prior to retirement, only a single location (e.g., the common secure storage location) may need to be accessed. This is much easier and more efficient than conventional systems, which may require accessing and deleting system firmware from memories of individual computer components of the system.

In some examples, the techniques described herein may enable live updating of computer components. For example, firmware modules from the common secure storage location can be loaded to random access memories of the computer components, and executed by the computer components from the random access memories. In this example, updates of the computer components may be applied without rebooting.

Figure 1:
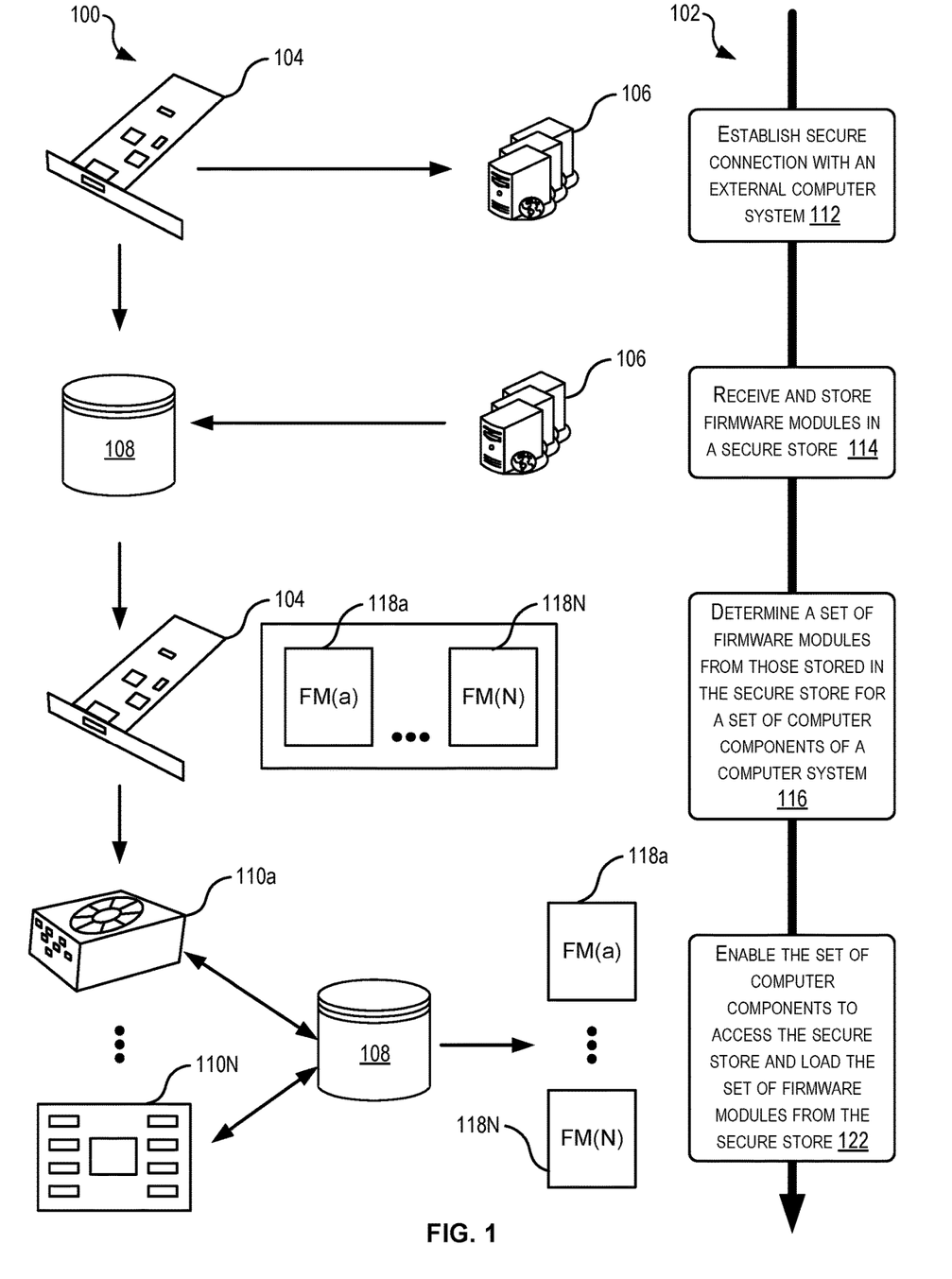
FIG. 1 is an example block diagram and associated flowchart showing a process for implementing techniques relating to loading firmware for various components from a secure location, according to at least one example.

Turning now to the figures, FIG. 1 is an example block diagram 100 and associated flowchart showing a process 102 for implementing techniques relating to loading firmware for various components from a secure location, according to at least one example. The diagram 100 depicts a computing device 104, an external computing system 106, a secure store 108 (firmware memory that is secure), and a plurality of computer components 110 that interact to perform the process 102. The techniques described herein may also be applied to firmware memories that are considered insecure or are not otherwise secured as described herein. In some examples, the process 102 can be performed by a firmware manager engine, which may be implemented by the computing device 104, and/or the external computing system 106.

The computing device 104 can include any suitable computing device that includes memory for storing computer-executable instructions and a processor for accessing the memory and executing the computer-executable instructions. In some examples, the computing device 104 is a peripheral card, such as a network card or other suitable computing device that also includes networking capabilities. In this manner, the computing device may be used to establish secure connections (e.g., with the external computing system 106).

The external computing system 106 can be any suitable server component capable of interacting with the computing device 104 (e.g., in a client/server relationship). For example, the external computing system 106 may be a computer server, server cluster, distributed virtual server (e.g., cloud-based server), or any other combination of computing resources (e.g., processing, storage, networking, etc.) suitable for supporting techniques described herein relating to management of firmware updates. In some examples, the external computing system 106 may be used by an administrator to identify firmware updates that should be shared with the computing device 104 for the computer components 110.

The process 102 may begin at 112 by establishing a secure connection with the external computer system 106. This may be performed using any suitable technique. In some examples, establishing the secure connection with the external computing system 106 may include establishing the computing device 104 and/or the secure datastore 108 as a secure root of trust. In this manner, communications between the computing device 104 and the external computing system 106 can be passed with high confidence.

At 114, the process 102 may include receiving and storing firmware modules in a secure store such as the secure store 108. This may be performed by the computing device 104.

In some examples, the secure store 108 is a secure datastore configured to store data in any suitable manner. For example, the secure store 108 can be implemented using a nonvolatile random access memory device. In some examples, the secure store 108 can be implemented using some form of read-only memory device(s). In any event, the firmware modules can be received from the external computing system 106. For example, the external computing system 106 may manage firmware for a particular group of servers, a rack of servers, a datacenter of servers, multiple datacenters of servers, etc. In this manner, decisions regarding firmware updates can be made in a centralized manner to ensure predictable results. The firmware modules can be stored in the secure store 108 for later access and loading by the computer components 110.

At 116, the process 102 may include determining a set of firmware modules 118a-118N from those stored in the secure store 108 for a set of computer components 110a-110N of a computer system. For example, the computer component 110a is an example of a power supply unit and the computer component 110N is an example of a graphics processing unit. This may be performed by the computing device 104. The computing device 104 may access a manifest of what computer components 110 are included on the computer system and which of those require firmware. Similarly, the computing device 104 may be configured to request current firmware information from the computer components 110, or access a local storage device (e.g., the secure store 108 or other device) that includes the firmware information.

At 122, the process 102 may include enabling the set of computer components 110 to access the secure store 108 and load the set of firmware modules 118 from the secure store 108. This may be performed by the computing device 104. In some examples, this may include the computing device 104 sending the firmware modules 118 from the secure store 108 to the computer components 110. In some examples, this may include the computing device 104 instructing the computer components 110 to access the firmware modules 118 from the secure store 108. For example, a particular computer component 110 may include an integrated memory device that typically is used to store firmware for the particular computer component 110. In this example, the computing device 104 and secure store 108 may be used to simulate the integrated memory device such that the particular computer component 110 does not recognize that it is loading firmware from the secure store 108 instead of the integrated memory device. Such simulation may be achieved, at least in part, by using a hardware switch that is electrically coupled between the integrated memory device and the processor of the particular computer component 110. This may enable, for example, routing electrical signals originally addressed to the integrated memory device to the secure store 108 instead. When electrical signals are sent back to the particular computer component 110 from the secure store (e.g., firmware modules), these signals may simulate the form that is used by the integrated memory device. Using a configuration signal, the hardware switch may be configured to route signals in this manner. As described herein, the hardware switch may be integrated into the particular computer component 110 or may be included in the motherboard. In some examples, the computer components 110 may also be configured so as to properly communicate with the secure store 108 and the computing device 104.

Figure 2:
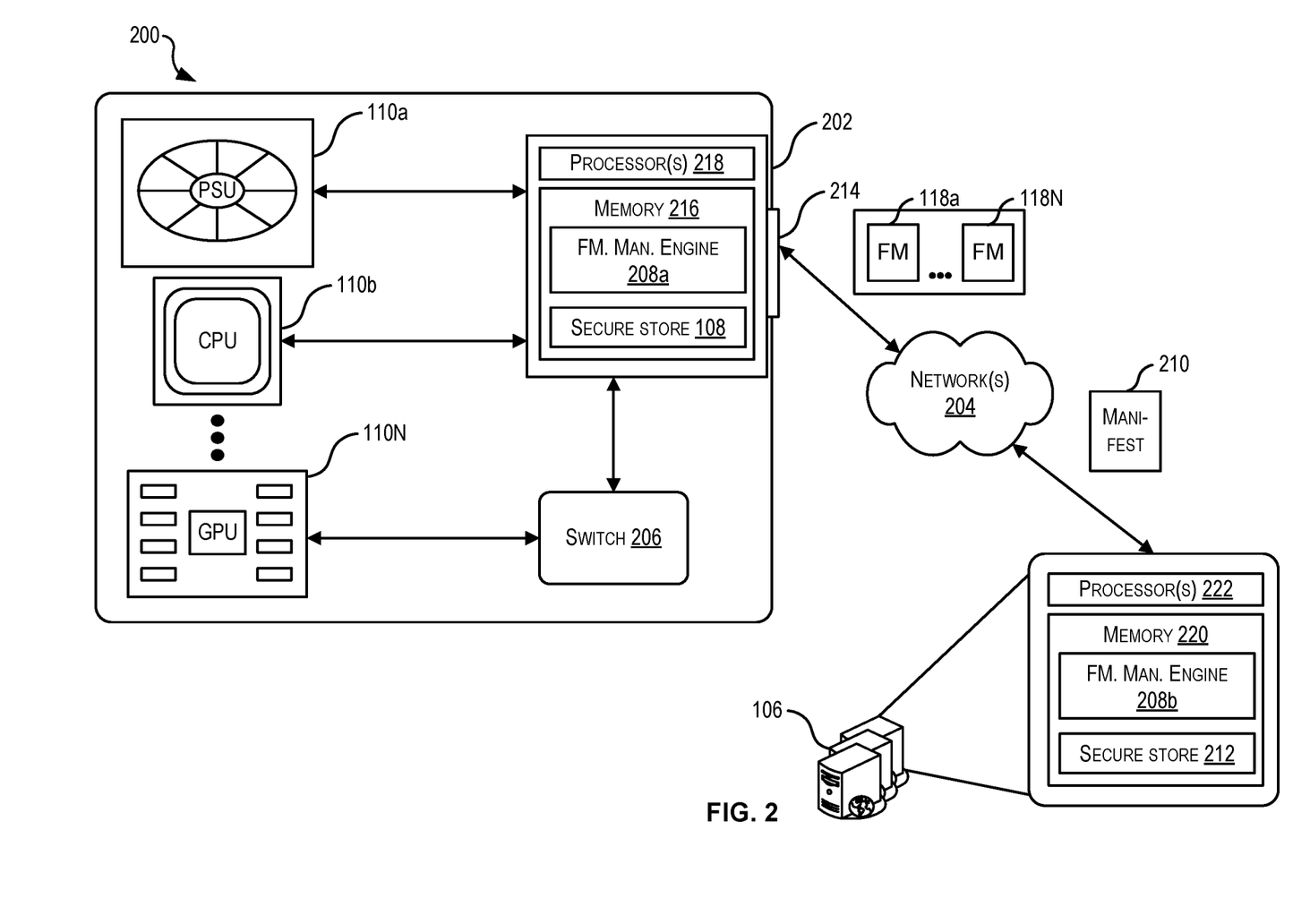
FIG. 2 is an example schematic architecture or system for implementing techniques relating to loading firmware for various components from a secure location, according to at least one example.

FIG. 2 is an example schematic architecture or system 200 for implementing techniques relating to loading firmware for various components from a secure location, according to at least one example. The system 200 may include a computer system 202 in network communication via one or more networks 204 with the external computer system 106. The network(s) 204 may include the Internet, cellular networks, cable networks, fiber networks, local area networks, an intranet, wide area network, and other public and/or private network.

The computer system 202 (e.g., any suitable server device) may include the computing device 104, the computer components 110 that use firmware, and one or more hardware switches 206. In some examples, the computer system 202 may include a system board (e.g., motherboard, mainboard, etc.) by which the computing device 104, the computer components 110, and/or the switch 206 are electrically coupled. In some examples, the computer system 202 is a server. For example, the computing device 104 and/or the computer components 110 may be separate devices, system chips, circuits, etc. that are physically attached to and electrically coupled with the system board of the computer system 202.

The computing device 104 may include any suitable computing device capable of performing the techniques described herein. For example, the computing device 104 may include a compute card that includes one or more network interfaces 214, memory(ies) 216 (e.g., RAM and/or ROM), processor(s) 218 (e.g., CPU), and the like. The processors 218 may be implemented as appropriate in hardware, computer-executable instructions, software, firmware, or combinations thereof. Computer-executable instruction, software, or firmware implementations of the processor may include computer-executable or machine-executable instructions written in any suitable programming language to perform the various functions described. In some examples, the computing device 104 may include a firmware manager engine 208a stored in the memory(ies) 216 and executable by the processor(s) 218. The firmware manager engine 208a may be configured to perform the functions described with reference to the computing device 104. For example, the firmware manager engine 208a may include a trusted platform module (TPM) or other comparable module to establish a secure connection or other trusted domain with the external computing system 106. This may include any suitable authentication and/or encryption approach such as, for example, public key cryptography, symmetric key cryptography, any other approaches for establishing and maintaining a secure connection.

In some examples, the firmware manager engine 208a may also be configured to request, download, store, and manage the firmware modules 118 from the external computing system 106. The firmware manager engine 208a may also be configured to request, download, store, and manage a firmware manifest 210. The firmware manifest 210 may include information to enable the firmware manager engine 208a to identify the computer components 110 and determine what, if any, firmware modules 118 should be loaded and/or updated by the computer components 110.

Within the memory(ies) 216 of the computing device 104 may be stored the secure store 108. The secure store 108 may be implemented by any suitable storage device (e.g., nonvolatile random access memory (NVRAM), random access memory (RAM), electrically erasable programmable read-only memory (EEPROM), etc.), which may include shared memory or may be dedicated to firmware memory. Generally, the secure store 108 can be used to store the firmware modules 118, the firmware manifest 210, and any other suitable information relating to implementing the techniques described herein. Depending on the format and data structure of the firmware modules 118 and the firmware manifest 210, the secure store 108 may include one or more databases, storage blocks, etc. for storing the firmware modules 118, the firmware manifest 210, and other information.

The computer components 110 may include any suitable electronic component of the computer system 202 that uses firmware. In this example, the computer component 110a is a power supply unit, the computer component 110b is a central processing unit, and the computer component 110N is a graphics processing unit. Other computer components 110 can include, BIOS, BMCs, network cards, compute cards, storage devices, microprocessors, and any other suitable electronic component that uses firmware. As described above, the computer components 110 can be electrically coupled as conventionally done on a system board. In some examples, at least some of the computer components 110 are not electrically coupled. For example, a single computing device 104 may be used to manage delivery of firmware to computer components 110 running on different servers, server slots, server shelves, server racks, etc.

As shown, at least some of the computer components 110 can be electrically coupled to the computing device 104 via a hardware switch 206. In some examples, each computer component 110 is coupled to the computing device 104 via its own hardware switch 206 and/or via one or more shared hardware switches 206. The hardware switch 206 may be a bus switch that is capable of directing signals between a computer component 110N and the computing device 104. For example, the hardware switch 206 can include a complex programmable logic device (CPLD), field programmable gate array (FPGA), programmable array logic (PAL), an application-specific integrated circuit (ASIC), or any other suitable device capable of functioning as a switch by selectively communicating with a desired computer component 110. As described herein, the hardware switch 206 can be separate from the computer component 110 or may be integrated with the computer component 110. In some examples, the computer components 110 can be electrically coupled with the computing device 104 without the use of a hardware switch 206. Use of the hardware switch 206 may be beneficial when the computer component 110 includes or has access to a storage device that typically stores firmware for the computer component 110.

Turning now to the external computing system 106, the external computing system 106 may include memory(ies) 220 (e.g., RAM and/or ROM), processor(s) 222 (e.g., CPU), and the like. The processors 222 may be implemented as appropriate in hardware, computer-executable instructions, software, firmware, or combinations thereof. Computer-executable instruction, software, or firmware implementations of the processor may include computer-executable or machine-executable instructions written in any suitable programming language to perform the various functions described. In some examples, the external computing system 106 may include a firmware manager engine 208b stored in the memory(ies) 220 and executable by the processor(s) 222. The memory 220 may include the firmware manager engine 208b and a datastore 212. The firmware manager engine 208b may include functionality similar to the firmware manager engine 208a. In some examples, the firmware manager engine 208b is used by an administrator to manage firmware updates at the computer system 202 and other computer systems 202 within the system 200 that are not shown. For example, the firmware manager engine 208b may be used to define which computer components 110 should include firmware modules including updates, patches, and/or replacement firmware. This information, along with information about the firmware modules and the computer components 110 may be included in the firmware manifest 210. Thus, the firmware manager engine 208b may be used to generate the firmware manifest 210. In some examples, the firmware manager engine 208b may be configured to communicate with the computing device 104 to establish the secure connection between the device 104 and the external computing system 106.

The datastore 212 may include any suitable storage media so as to store a version of the firmware manifest 210 and/or the firmware modules 118. In some examples, the firmware modules 118 are queued for downloading to the computing device 104 within the datastore 212. In some examples, the secure store 108 may be a replication of at least a portion of the datastore 212.

Figure 3:
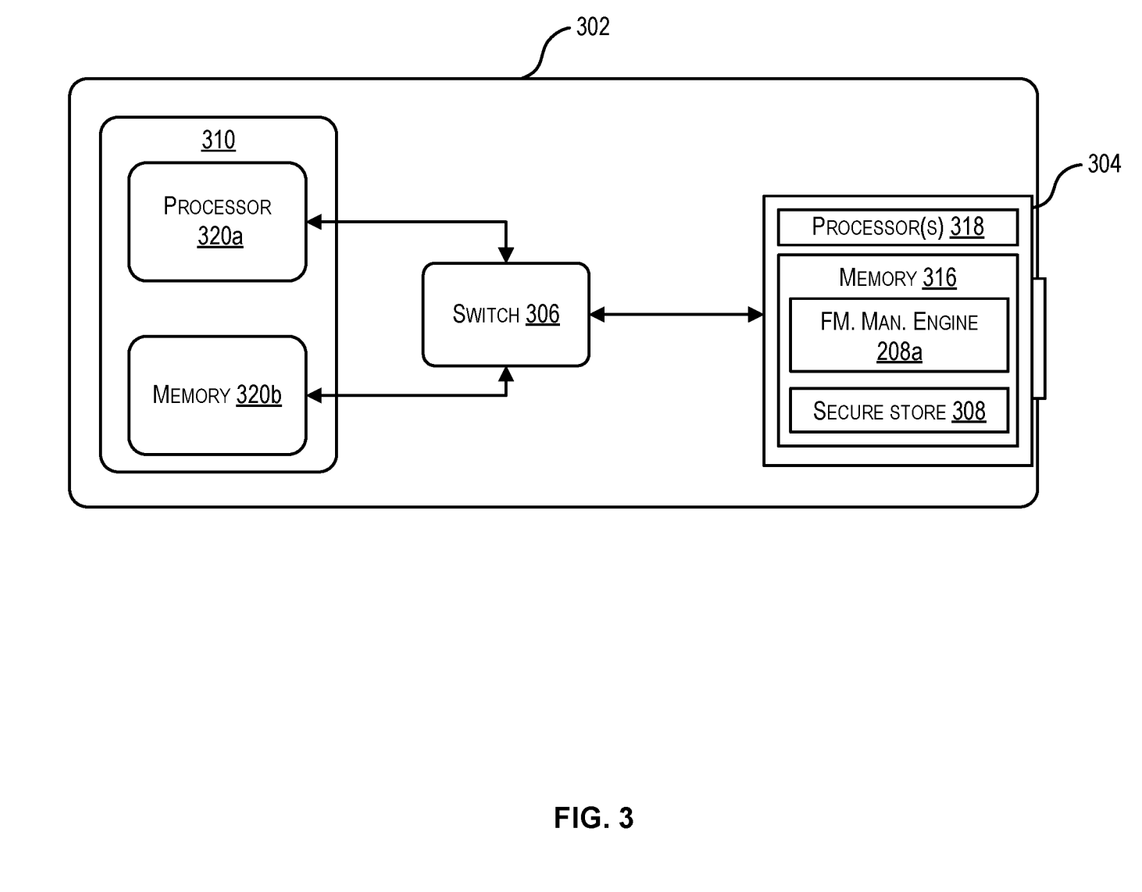
FIG. 3 is an example computer system including a hardware switch for implementing techniques relating to loading firmware for various components from a secure location, according to at least one example.

FIG. 3 is an example computer system 302 including a hardware switch 306 for implementing techniques relating to loading firmware for various components from a secure location, according to at least one example. The hardware switch 306 is an example of the hardware switch 206. The computer system 302 is an example of the computer system 202. Thus, the computer system 302 may include the hardware switch 306, a computer component 310 (e.g., the computer component 110), and a computing device 304 (e.g., the computing device 104). The computer component 310 can include a first component 320a (e.g., a processor) and a second component 320b (e.g., a memory). For example, the second component 320b may be a memory device for storing firmware (e.g., serial peripheral interface (SPI) based flash memory or any other suitable memory device configured to store firmware). The first component 320a may include the components of the computer component 310, such as a processor that execute the firmware during booting. Thus, the second component 320b may store firmware that is used by the first component 320a.

The hardware switch 306 may be capable of switching signals intended to be between the first component 320a and the second component 320b to be exchanged between the computing device 304 and the first component 320a. In this manner, instead of loading the firmware from the second component 320b, the first component 320a may access a secure store of the computing device 304 and load the firmware from the secure store. In some examples, the computing device 304 may send the firmware to the first component 320a. In some examples, the hardware switch 306 is used by other computer components 310 to interact with the computing device 304.

The hardware switch 306 may be included as part of the computer system 302 separate from the computer component 310. For example, the hardware switch 306 may be included in a system board or as a device attached to the system board that is used to implement the computer system 302.

In some examples, use of the hardware switch 306 may enable the computer component 310 to switch between an on-device firmware mode and an off-device firmware mode. In the on-device firmware mode, the first component 320a may access and execute firmware from the second component 320b via the hardware switch 306. In the off-device firmware mode, the first component 320a may access and execute firmware from the computing device 304 (e.g., in a secure store) via the hardware switch 306.

Figure 4:
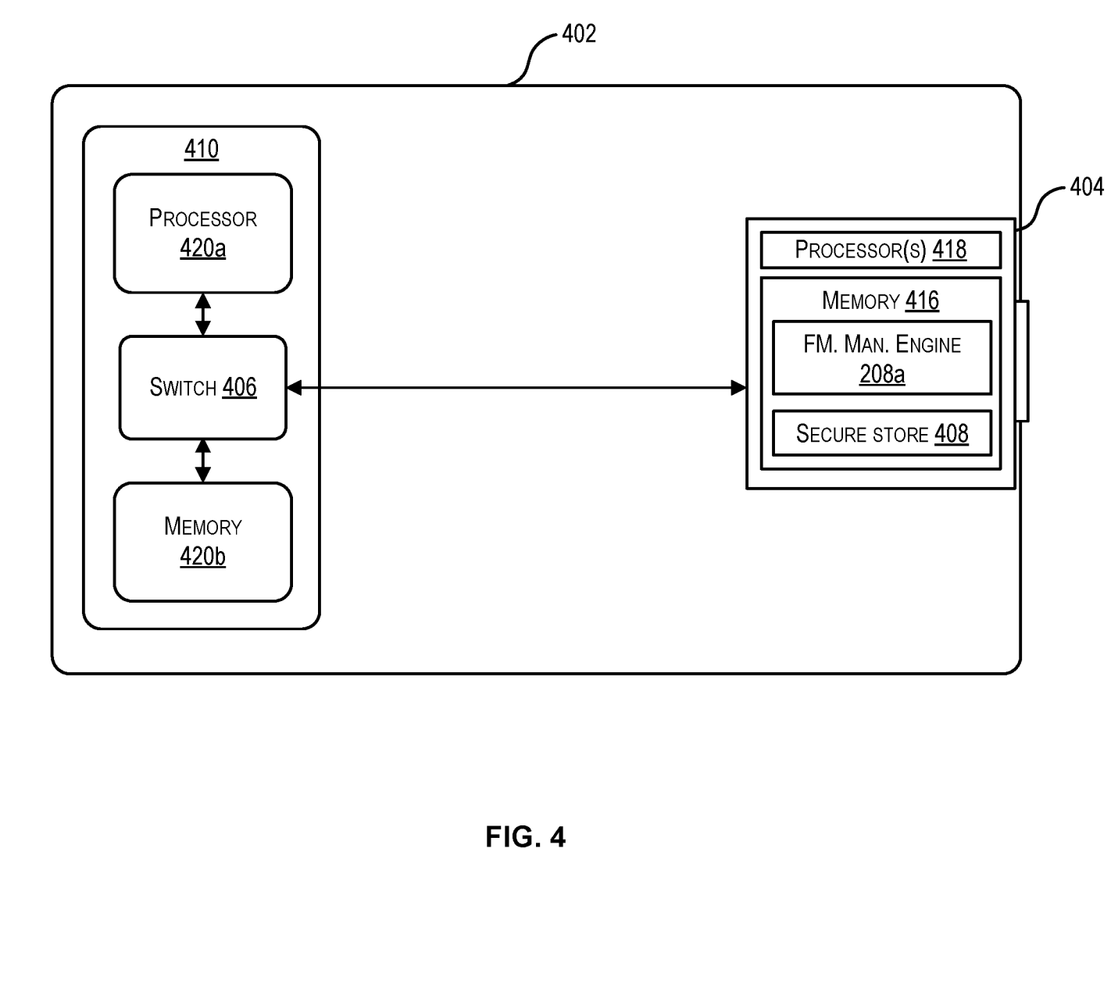
FIG. 4 is an example computer system including an integrated hardware switch for implementing techniques relating to loading firmware for various components from a secure location, according to at least one example.

FIG. 4 is an example computer system 402 including an integrated hardware switch 406 for implementing techniques relating to loading firmware for various components from a secure location, according to at least one example. The hardware switch 406 is an example of the hardware switch 206. The computer system 402 is an example of the computer system 202. Thus, the computer system 402 may include the hardware switch 406, a computer component 410 (e.g., the computer component 110), and a computing device 404 (e.g., the computing device 104). The computer component 410 can include a first component 420a (e.g., a processor) and a second component 420b (e.g., a memory). For example, the second component 402b may be a memory device for storing firmware (e.g., serial peripheral interface (SPI) based flash memory or any other suitable memory device configured to store firmware). The first component 420a may include the components of the computer component 410, such as a processor that execute the firmware during booting. Thus, the second component 420b may store firmware that is used by the first component 420a.

The hardware switch 406 may be capable of switching signals intended to be between the first component 420a and the second component 420b to be exchanged between the computing device 404 and the first component 420a. In this manner, instead of loading the firmware from the second component 420b, the first component 420a may access a secure store of the computing device 404 and load the firmware from the secure store. In some examples, the computing device 404 may send the firmware to the first component 420a. In some examples, the hardware switch 406 is used by other computer components 410 to interact with the computing device 404.

The hardware switch 406 may be integrated into the computer component 410. For example, the hardware switch 406 may be hard wired within the computer component 410.

In some examples, use of the hardware switch 406 may enable the computer component 410 to switch between an on-device firmware mode and an off-device firmware mode. For example, if the computer component 410 were unable to access the secure store or other common firmware memory, a module on the computer component 410 may cause the computer component 410 to switch into an on-device firmware mode. In some examples, a system controller, operating system, or other management device may instruct the computer component 410 to change from one mode to the other. For example, booting up the computer component 410 in each of the modes may be used for diagnostic purposes. In this example, an administrator or other authorized user may issue a command that switches the mode. As part of the mode changing, the hardware switch 406 may be reconfigured to appropriately direct communications either between the first component 420a and the second component 420b or between the first component 420a and the computing device 404. Thus, in the on-device firmware mode, the first component 420a may access and execute firmware from the second component 420b via the hardware switch 406. In the off-device firmware mode, the first component 420a may access and execute firmware from the computing device 404 (e.g., in a secure store) via the hardware switch 306.

Figure 5:
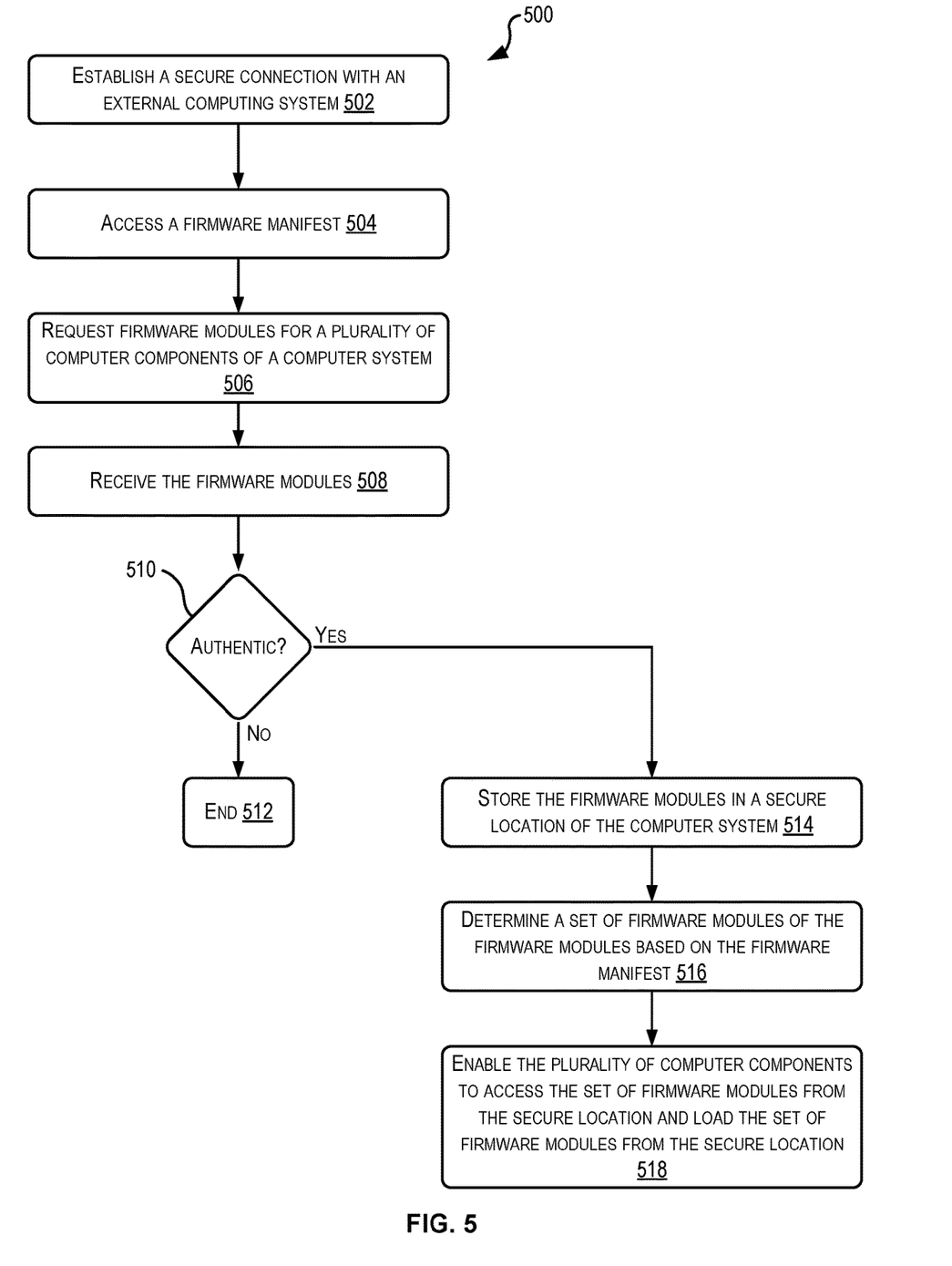
FIG. 5 is an example flow diagram depicting example acts for implementing techniques relating to loading firmware for various components from a secure location, according to at least one example.
Figure 6:
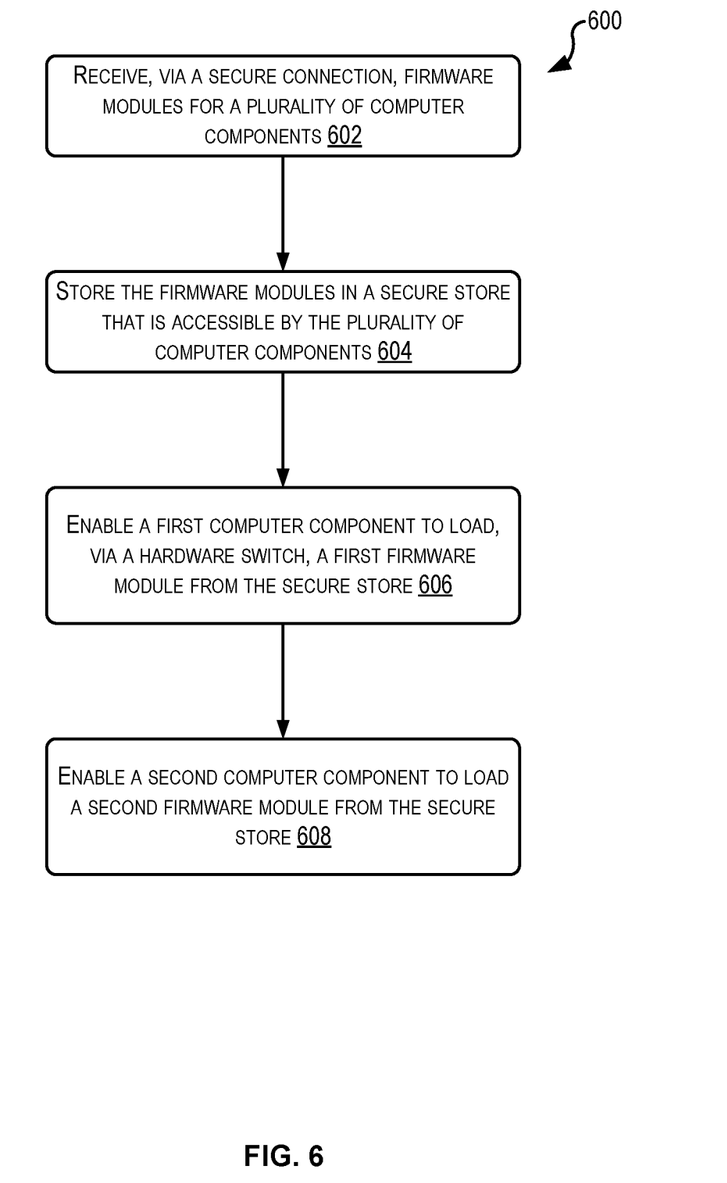
FIG. 6 is an example flow diagram depicting example acts for implementing techniques relating to loading firmware for various components from a secure location, according to at least one example.
Figure 7:
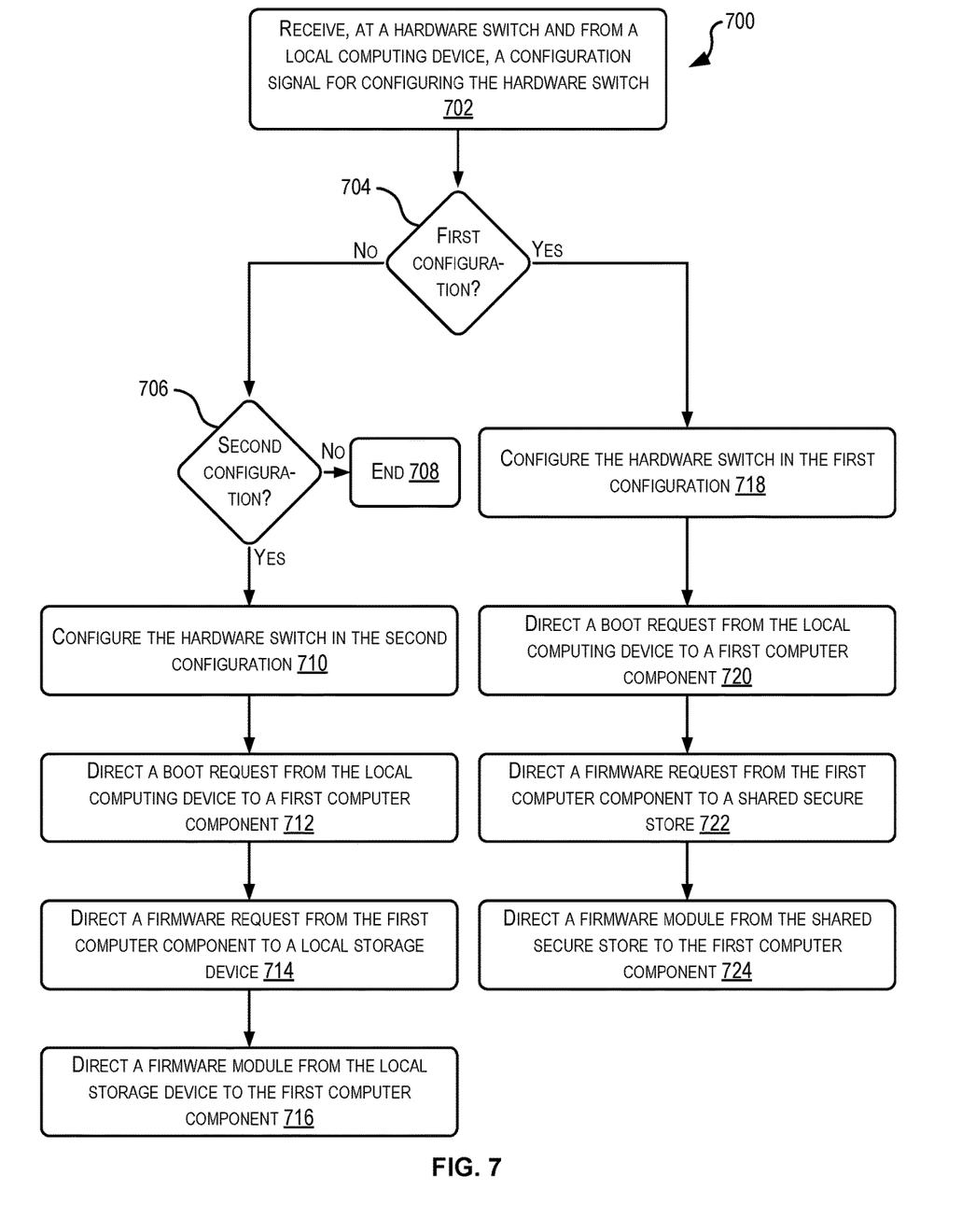
FIG. 7 is an example flow diagram depicting example acts for implementing techniques relating to loading firmware for various components from a secure location, according to at least one example.

FIGS. 5, 6, and 7 illustrate example flow diagrams showing respective processes 500, 600, and 700 as described herein. These processes 500, 600, and 700 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

FIG. 5 is flow diagram of process 500 depicting example acts for implementing techniques relating to loading firmware for various components from a secure location, according to at least one example. The computing device 104 (FIG. 1) may perform the process 500 using the firmware manager engine 208a (FIG. 2).

The process 500 may begin at 502 by establishing a secure connection with an external computing system. In some examples, establishing the secure connection may include establishing a secure network connection with the external computing system. In some examples, the secure connection may be established using a cryptographic process.

At 504, the process 500 may include accessing a firmware manifest. This may include, for example, receiving the firmware manifest from the external computing system via the secure connection. In some examples, the firmware manifest may be accessed from the secure location or some other location accessible by the system performing the process 500. The firmware manifest may include any suitable data structure for storing data about the firmware modules and the plurality of computer components. For example, the firmware manifest may include component identifiers for identifying the plurality of computer components, addresses for addressing communications to the plurality of computer components, firmware identifiers for identifying the firmware modules, version identifies for identifying versions for the firmware modules, a storage simulation type for each of the plurality of computer components, an expiration date for each of the firmware modules, a boot order for booting the plurality of computer components, and any other suitable information relating to updating the firmware modules. In some examples, the manifest may be created by an administrator who is responsible for managing firmware of the computer system and, in some examples, many other computer systems with which the computer system is associated.

At 506, the process 500 may include requesting firmware modules for a plurality of computer components of a computer system based on the firmware manifest. Requesting may include requesting from the external computing system via the secure connection. The computer system may be a server and may include a system board (e.g., a motherboard) to which the plurality of computer components is attached.

At 508, the process 500 may include receiving the firmware modules. This may include receiving the firmware modules from the external computer system via the secure connection based on the requesting.

At 510, the process 500 may include determining whether the firmware modules are authentic, which may be considered measuring the firmware modules. This may include confirming that version history matches an expected version history. In some examples, determining whether the firmware modules are authentic can also include verifying whether the entity that created the firmware modules is a trusted entity (e.g., is on a white list of entities). In some examples, determining whether the firmware modules are authentic can also include scanning the code that makes up the firmware modules to determine whether potential threats (e.g., nefarious code) are present. In some examples, determining whether the firmware modules are authentic can also include simulating loading the code in a safe mode of an operating system. In some examples, determining whether the firmware modules are authentic can also include determining whether the firmware modules properly correspond to the actual computer components of the computer system. In some examples, determining whether the firmware modules are authenticate may include comparing the firmware modules to existing firmware modules to identify differences between the new and the existing firmware modules. These differences may inform the system whether the firmware modules should be implemented. In some examples, authenticating the firmware modules may be based on the firmware manifest. For example, a checksum operation may be performed with respect to the manifest and the firmware modules.

If the code is not authentic or if its authenticity cannot be confirmed, then the process 500 may end at 512. If the code is determined to be authentic and/or there are no indications of nefarious code, the process 500 may proceed to 514. At 514, the process 500 may include storing the firmware modules, such as in a secure location of the computer system. For example, the firmware modules can be stored in a data store that is a secure network storage location associated with the secure connection. For example, the data store may be a secure network storage location of the external computing system. The data store may include a nonvolatile random-access memory device.

At 516, the process 500 may include determining a set of firmware modules of the firmware modules based on the firmware manifest. For example, as all of the firmware modules may not be appropriate for the plurality of computer components, the firmware manifest may be used to determine which of the firmware modules are appropriate. For example, this determination may also be based on the determination performed at 510.

At 518, the process 500 may include enabling the plurality of computer components to access the set of firmware modules from the secure location and load the set of firmware modules from the secure location. Accessing the set of firmware modules may be performed as part of booting the plurality of computer components. For example, as a computer component begins its boot process, it may make a request for firmware. In response, access may be given to the secure location. In some examples, enabling the plurality of computer components to access the set of firmware modules from the secure location may include sending the set of firmware modules from the secure store to the plurality of computer components.

In some examples, the plurality of computer components may access the secure location via one or more hardware switches, as described above. These switches may be configured to direct signals between the plurality of computer components and the secure store.

In some examples, enabling the plurality of computer components to access the set of firmware modules may include sending, via the one or more hardware switches, the set of firmware modules to the set of computer components based on the addresses in the firmware manifest.

FIG. 6 is flow diagram of process 600 depicting example acts for implementing techniques relating to loading firmware for various components from a secure location, according to at least one example. The computing device 104 (FIG. 1) may perform the process 600 using the firmware manager engine 208*a* (FIG. 2).

The process 600 may begin at 602 by receiving, via a secure connection, firmware modules for a plurality of computer components. The plurality of computer components may be associated with a computer system. For example, the plurality of computer components may together make up the internal components of a server.

At 604, the process 600 may include storing the firmware modules in a store (such as a secure store) that is accessible by the plurality of computer components.

At 606, the process 600 may include enabling a first computer component to load, via a hardware switch, a first firmware module of the firmware modules from the secure store. In some examples, the hardware switch may be implemented to enable the first computer component to access the secure store while also retaining a connection with a local memory device that also stores firmware. For example, the local memory device may be used during manufacturing and testing to ensure that the first computer component works appropriately. Following building of a computer system that includes the first component, the first computer component may access firmware from the secure store via the hardware switch instead of looking to the local memory device.

In some examples, the hardware switch may be integrated into the first computer component or may be separate (e.g., in a system board). In some examples, enabling the first computer component to access the first firmware module and load the first firmware module may be performed in connection with a reboot of the computer system.

In some examples, enabling the first computer component to access, via the hardware switch, a first firmware module from the secure store may include the device (e.g., the computing device 104) sending a configuration signal to the hardware switch to allow data transfer between the first computer component and the secure store.

At 608, the process 600 may include enabling a second computer component to load a second firmware module of the firmware modules from the secure store. In contrast to the first computer component, the second computer component may access the second firmware module without accessing the hardware switch or any other hardware switch. For example, the second computer component may have a direct electrical coupling with the secure store and/or a computing device that manages access to the secure store. In some examples, this configuration may be appropriate for configurations in which the computer component does not include its own memory device for storing firmware. Instead, the computer component (e.g., the second computer component) may be directed to a common firmware storage location (e.g., the secure store) for accessing firmware (e.g., firmware modules).

In some examples, the process 600 may further include receiving a firmware manifest. In this example, determining the first and second firmware modules for the first and second computer components may be based on the firmware manifest. In some examples, the firmware manifest may include a data structure that includes one or more of: component identifiers for identifying the plurality of computer components, addresses for addressing communications to the plurality of computer components, version identifiers for identifying versions of the firmware module, a storage simulation type for each of the plurality of computer components, and/or an expiration date for each of the firmware modules.

In some examples, the process 600 may include receiving, via the secure connection, an updated firmware module applicable to the first firmware module. In this example, the process 600 may further include performing a live update of the first firmware module by at least: storing the updated firmware module in the secure store, loading the updated firmware module from the secure store to a random access memory of the first computer component, and enabling the first computer component to execute the updated firmware module from the secure store.

FIG. 7 is flow diagram of process 700 depicting example acts for implementing techniques relating to loading firmware for various components from a secure location, according to at least one example. The hardware switch 206 (FIG. 2) and/or the computing device 104 (FIG. 1) may perform the process 700 using the firmware manager engine 208*a* (FIG. 2).

The process 700 may begin at 702 receiving, at a hardware switch and from a local computing device, a configuration signal for configuring the hardware switch.

At 704, the process 700 may include determining whether the configuration signal configures the hardwire switch in a first configuration.

If the answer at 704 is no, the process 700 may proceed to 706. At 706, the process 700 may include determining whether the configuration signal configures the hardware switch in a second configuration. The second configuration may be different from the first configuration. If the answer at 704 is no, the process 700 may end at 708.

If the answer at 706 is yes, the process 700 may proceed to 710. At 710, the process 700 may include configuring the hardware switch in the second configuration. Configuring the hardware switch in the second configuration may enable a first computer component to access firmware modules from a local storage device.

At 712, the process 700 may include directing a boot request from the local computing device to a first computer component. The boot request may be initiated as part of the booting of a computer system that includes the local computing device and the first computer component.

At 714, the process 700 may include directing a firmware request from the first computer component to a local storage device. The local storage device may be electrically coupled with the first computer component via the hardware switch.

At 716, the process 700 may include directing a firmware module from the local storage device to the first computer component. In some examples, directing the firmware module may include passing the firmware module via the hardware switch.

Returning now to the determination at 704, if the answer at 704 is yes, the process 700 proceeds to 718. At 718, the process 700 may include configuring the hardware switch in the first configuration. This first configuration may enable the first computer component to access firmware via the hardware switch and from a shared secure store.

At 720, the process 700 may include directing a boot request from the local computing device to the first computer component. This may include a signal that tells the first computer component to begin booting.

At 722, the process 700 may include directing a firmware request from the first computer component to a shared secure store. This may include a signal that requests firmware from the shared secure store. The shared secure store is a common location from which the first computer component and other computer components can access firmware.

At 724, the process 700 may include directing a firmware module from the shared secure store to the first computer component. This may including directing the firmware module and/or other signals relating to the firmware module via the hardware switch.

The specification and drawings are to be regarded in an illustrative rather than a restrictive sense. It will, however, be evident that various modifications and changes may be made thereunto without departing from the broader spirit and scope of the disclosure as set forth in the claims. Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A server computer, comprising:
   a motherboard;
   a plurality of computer components electrically coupled to the motherboard;
   a secure store for storing firmware modules for the plurality of computer components, the secure store being electrically coupled to the plurality of computer components via the motherboard;
   a bus switch electrically coupled to the plurality of computer components via the motherboard, the bus switch being configured to connect the plurality of computer components to the secure store for loading firmware; and
   a peripheral card on the motherboard, the peripheral card being electrically coupled to the plurality of computer components via the bus switch, the computing device comprising a firmware manager engine configured to:
      establish a network connection with an external computing system, the external computing system being previously authenticated;
      receive, from the external computing system and via the network connection, a set of firmware modules for a subset of the plurality of computer components;
      receive a firmware manifest from the external computing system and via the network connection, the firmware manifest comprising component identifiers for identifying the plurality of computer components;
      store the set of firmware modules and the firmware manifest in the secure store;
      enable a first computer component of the subset of the plurality of computer components to load, via the bus switch, a first firmware module of the set of firmware modules from the secure store during booting of the subset of the plurality of computer components, the set of firmware modules determined based on the firmware manifest; and
      enable a second computer component of the subset of the plurality of computer components to load a second firmware module of the firmware modules from the secure store, the second computer component loading the second firmware module without accessing the bus switch, the second firmware module determined based on the firmware manifest.

2. The server computer of claim 1, wherein enabling the first computer component to load, via the bus switch, the first firmware module set of firmware modules from the secure store comprises sending, via the bus switch, the first firmware module to the first computer component based on addresses included in the firmware manifest for addressing communications to the plurality of computer components.

3. The server computer of claim 1, wherein the firmware manager engine is further configured to, prior to storing the set of firmware modules, confirm authenticity of the set of firmware modules.

4. The server computer of claim 1, wherein enabling the first computer component to load, via the bus switch, the first firmware module from the secure store comprises loading the first firmware module in a set of random access memories of the first computer component and executing the set of firmware modules from the set of random access memories.

5. The server computer of claim 1, wherein the secure store comprises a nonvolatile random-access memory device.

6. The server computer of claim 1, wherein the peripheral card is a network card.

7. A device, comprising:
a physical memory configured to store computer-executable instructions; and
a processor configured to access the instruction memory and execute the computer-executable instructions to at least:
establish a network connection with an external computing system, the external computing system being previously authenticated;
receive, from the external computing system and via the network connection, firmware modules for a plurality of computer components that are electrically coupled to the device;
receive, from the external computing system and via the network connection, a firmware manifest comprising component identifiers for identifying the plurality of computer components;
store the firmware modules and the firmware manifest in a firmware memory, the firmware memory being electrically coupled to the device, external to the computer component, and configured to store the firmware modules for the plurality of computer components, the plurality of computer components configured to load the firmware modules from the firmware memory;
enable a first computer component of the plurality of computer components to load a first firmware module of the firmware modules from the firmware memory by at least identifying the first computer component using the firmware manifest and sending the first firmware module to the first computer component via a bus switch that is electrically coupled to the device, the first computer component, and a local memory of the first computer component; and
enable a second computer component of the plurality of computer components to load a second firmware module of the firmware modules from the firmware memory, the second computer component loading the second firmware module without accessing the bus switch, the second firmware module determined based on the firmware manifest.

8. The device of claim 7,
wherein receiving the firmware modules from the external computing system comprises receiving the firmware modules via a secure connection.

9. The device of claim 7, further comprising the firmware memory.

10. The device of claim 7, wherein the processor is further configured to access the instruction memory and execute the computer-executable instructions to at least authenticate the first firmware module before enabling the first computer component to load the first firmware module.

11. The device of claim 7, wherein the first firmware module is a firmware update.

12. The device of claim 7, wherein the bus switch is integrated into the first computer component or is separate from the first computer component and connected to the first computer component via a motherboard.

13. A computer-implemented method, comprising:
establishing a network connection with an external computing system, the external computing system being previously authenticated;
receiving, from the external computing system and via the network connection, firmware modules for a plurality of computer components of a computer system;
receiving, from the external computing system and via the network connection, a firmware manifest comprising component identifiers for identifying the plurality of computer components;
storing the firmware modules and the firmware manifest in a secure store that is accessible by the plurality of computer components;
enabling a first computer component to load, via a bus switch, a first firmware module of the firmware modules from the secure store, the first firmware module determined based on the firmware manifest; and
enabling a second computer component to load a second firmware module of the firmware modules from the secure store, the second computer component loading the second firmware module without accessing the bus switch, the second firmware module determined based on the firmware manifest.

14. The computer-implemented method of claim 13, wherein the firmware manifest comprises:
addresses for addressing communications to the plurality of computer components, version identifiers for identifying versions of the firmware modules, a storage simulation type for each of the plurality of computer components, or an expiration date for each of the firmware modules.

15. The computer-implemented method of claim 13, further comprising: receiving an updated firmware module applicable to the first firmware module; and performing a live update of the first firmware module by at least: storing the updated firmware module in the secure store; loading the updated firmware module from the secure store to a random access memory of the first computer component; and enabling the first computer component to execute the updated firmware module from the random access memory.

16. The computer-implemented method of claim 13, wherein the first computer component comprises the bus switch.

17. The computer-implemented method of claim 13, wherein enabling the first computer component to load, via the bus switch, the first firmware module is performed in connection with a reboot of the computer system.

18. The computer-implemented method of claim 13, wherein enabling the first computer component to load, via the bus switch, the first firmware module from the secure store comprises sending a signal to the bus switch to configure the bus switch to allow data transfer between the first computer component and the secure store.

* * * * *